US009831940B2

(12) United States Patent
Patel et al.

(10) Patent No.: US 9,831,940 B2
(45) Date of Patent: Nov. 28, 2017

(54) GAIN/FLATNESS ENHANCEMENT FOR RF SWITCH MATRIX

(71) Applicant: Hughes Network Systems, LLC, Germantown, MD (US)

(72) Inventors: Kumudchandra Shantilal Patel, Clarksburg, MD (US); Daniel Raymond Wendling, Gaithersburg, MD (US); Minheng Shan, Rockville, MD (US); Walter Robert Kepley, III, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/956,363

(22) Filed: Dec. 1, 2015

(65) Prior Publication Data

US 2017/0155444 A1    Jun. 1, 2017

(51) Int. Cl.
*H04B 7/185* (2006.01)
*H04W 40/16* (2009.01)
*H04W 52/52* (2009.01)

(52) U.S. Cl.
CPC ..... *H04B 7/18584* (2013.01); *H04B 7/18582* (2013.01); *H04W 40/16* (2013.01); *H04W 52/52* (2013.01)

(58) Field of Classification Search
CPC .............. H03K 17/002; H04B 7/18582; H04B 7/18584; H04W 40/16; H04W 52/02
(Continued)

(56) References Cited

U.S. PATENT DOCUMENTS

| 4,739,247 A | 4/1988 | Cisco et al. |
| 5,446,370 A | 8/1995 | Voight |

(Continued)

FOREIGN PATENT DOCUMENTS

| CN | 201708798 U | 1/2011 |
| EP | 1328076 A2 | 7/2003 |
| WO | 3509484 A1 | 4/1995 |

OTHER PUBLICATIONS

International Search Report and Written Opinion dated Feb. 17, 2017 by the International Searching Authority (European Patent Office) in PCT Application PCT/US2016/064490.

(Continued)

*Primary Examiner* — Raymond Dean
(74) *Attorney, Agent, or Firm* — NovoTechIP International PLLC

(57) ABSTRACT

A method including determining that a first radio frequency (RF) port has been selected to be coupled via an M by N RF switch matrix to a second RF port, wherein the M by N radio frequency (RF) switch matrix includes M first-side RF ports and N second-side RF ports, the first RF port is included in the M first-side RF ports, the second RF port is included in the N second-side RF ports, M is at least 2 and N is at least 2, and each of the first-side RF ports may be selectively coupled to and uncoupled from at least one of two or more of the second-side RF ports, such that RF signals are carried between selectively coupled RF ports; obtaining a first indicator indicating a frequency, frequency range, channel, or band for an RF signal to be carried via the second RF port while coupled to the first RF port; obtaining, in response to the determination that the first RF port has been selected to be coupled to the second RF port, a first adjustment value based on the first indicator, the first RF port, and the second RF port; and causing a first amplitude adjustment device configured to attenuate and/or amplify an RF signal as it (Continued)

passes through the first RF port or the second RF port with a selectable amount of attenuation and/or amplification to select a first amount of attenuation and/or amplification determined based on the first adjustment value.

20 Claims, 10 Drawing Sheets

(58) Field of Classification Search
USPC ...... 455/3.02, 13.3, 428, 12.1, 427; 370/316
See application file for complete search history.

(56) References Cited

U.S. PATENT DOCUMENTS

| | | | |
|---|---|---|---|
| 5,596,269 A | 1/1997 | Miller | |
| 6,728,554 B1* | 4/2004 | Wegner | H01Q 1/246 342/373 |
| 6,973,287 B2 | 12/2005 | Franzen et al. | |
| 7,019,882 B1* | 3/2006 | Wilson | H04B 10/50 359/237 |
| 7,805,165 B2* | 9/2010 | Tsai | H03K 17/002 455/557 |
| 2011/0269416 A1* | 11/2011 | Kadoi | H04B 1/0458 455/127.2 |
| 2013/0148570 A1 | 6/2013 | Miller et al. | |

OTHER PUBLICATIONS

International Search Report and Written Opinion dated Mar. 10, 2017 by the International Searching Authority (European Patent Office) in PCT Application PCT/US2016/064408.

* cited by examiner

GAIN/FLATNESS ENHANCEMENT FOR RF SWITCH MATRIX

BACKGROUND

To interface one piece of radio frequency (RF) communication equipment with another, such as a satellite data modem with a radio frequency terminal (RFT), an RF switch matrix may be utilized to route RF signals. The RF switch matrix may change the amplitude of the RF signal, which often is left to be handled by automatic gain control (AGC) circuitry included in downstream pieces of RF equipment.

SUMMARY

In a general aspect, a communication apparatus comprising a first M by N radio frequency (RF) switch matrix comprising M first-side RF ports, N second-side RF ports, and a first plurality of amplitude adjustment devices, wherein M is at least 2 and N is at least 2, each of the first-side RF ports may be selectively coupled to and uncoupled from at least one of two or more of the second-side RF ports, such that RF signals are carried between selectively coupled RF ports, the first-side RF ports include a first RF port, the second-side RF ports include a second RF port, either each of the first-side RF ports includes only one of the first plurality of amplitude adjustment devices, or each of the second-side RF ports includes only one of the first plurality of amplitude adjustment devices, each of the first plurality of amplitude adjustment devices is configured to attenuate and/or amplify an RF signal passing through the RF port in which the amplitude adjustment device is included with a selectable amount of attenuation and/or amplification that is selected in response to a command signal supplied to the amplitude adjustment device, and the first plurality of amplitude adjustment devices includes a first amplitude adjustment device included in either the first RF port or the second RF port; and a controller configured to determine the first RF port has been selected to be coupled via the first RF switch matrix to the second RF port, obtain a first indicator indicating a frequency, frequency range, channel, or band for an RF signal to be carried via the second RF port while coupled to the first RF port, obtain, in response to the determination that the first RF port has been selected to be coupled to the second RF port, a first adjustment value based on the first indicator, the first RF port, and the second RF port, and supply a first control signal to the first amplitude adjustment device to cause the first amplitude adjustment device to select a first amount of attenuation and/or amplification, wherein the first control signal is generated based on the first adjustment value.

Particular implementations may include one or more of the following features. Each of the first plurality of amplitude adjustment devices may be included in one of the second-side RF ports; and each of the second-side RF ports may include only one of the first plurality of amplitude adjustment devices. The second RF port may be configured to receive an RF signal from the first port while the second RF port is selectively coupled to the first RF port.

Each of the first plurality of amplitude adjustment devices may be included in one of the first-side RF ports; and each of the first-side RF ports may include only one of the first plurality of amplitude adjustment devices.

The communication apparatus may further comprise a nonvolatile memory, wherein the controller is further configured to obtain the first adjustment value from the nonvolatile memory.

The controller may be further configured to obtain a second adjustment value, different from the first adjustment value, from the nonvolatile memory based on the first indicator, the first RF port, and the second RF port; and generate the first control signal based on the first adjustment value and the second adjustment value.

The first-side RF ports may include a third RF port different from the first RF port; the second-side RF ports may include a fourth RF port different from the second RF port; the first plurality of amplitude adjustment devices may include a second amplitude adjustment device included in either the third RF port or the fourth RF port; and the controller may be further configured to determine the third RF port has been selected to be coupled via the first RF switch matrix to the fourth RF port, obtain a second indicator indicating a frequency, frequency range, channel, or band for an RF signal to be carried via the fourth RF port while coupled to the third RF port, obtain, in response to the determination that the third RF port has been selected to be coupled to the fourth RF port, a second adjustment value based on the second indicator, the third RF port, and the fourth RF port, and supply a second control signal to the second amplitude adjustment device to cause the second amplitude adjustment device to select a second amount of attenuation and/or amplification, wherein the second control signal is generated based on the second adjustment value.

The first-side RF ports may include a third RF port different from the first RF port; the first amplitude adjustment device may be included in the second RF port; and the controller may be further configured to determine, after supplying the first control signal, the third RF port has been selected to be coupled via the first RF switch matrix to the second RF port, obtain, after supplying the first control signal, a second indicator different from the first indicator, the second indicator indicating a frequency, frequency range, channel, or band for an RF signal to be carried via the second RF port while coupled to the third RF port, obtain, in response to the determination the third RF port has been selected to be coupled to the second RF port, a second adjustment value based on the second indicator, the third RF port, and the second RF port, and supply a second control signal to the first amplitude adjustment device to cause the first amplitude adjustment device to select a second amount of attenuation and/or amplification, wherein the second control signal is generated based on the second adjustment value.

The communication apparatus may further comprise a second X by Y RF switch matrix comprising X third-side RF ports, Y fourth-side RF ports, and a second plurality of amplitude adjustment devices, wherein X is at least 2 and Y is at least 2, each of the third-side RF ports may be selectively coupled to and uncoupled from at least one of two or more of the fourth-side RF ports, such that RF signals are carried between selectively coupled RF ports, the third-side RF ports include a third RF port, the fourth-side RF ports include a fourth RF port, none of the second plurality of amplitude adjustment devices are included in the first plurality of amplitude adjustment devices, either each of the third-side RF ports includes only one of the second plurality of amplitude adjustment devices, or each of the fourth-side RF ports includes only one of the second plurality of amplitude adjustment devices, each of the second plurality of amplitude adjustment devices is configured to attenuate and/or amplify an RF signal passing through the RF port in which the amplitude adjustment device is included with a selectable amount of attenuation and/or amplification that is selected in response to a control signal supplied to the amplitude adjustment device, and the second plurality of amplitude adjustment devices includes a second amplitude adjustment device included in either the third RF port or the fourth RF port; and wherein the controller may be further configured to determine, in association with the determination that the first RF port has been selected to be coupled to the second RF port, the third RF port has been selected to be coupled via the second RF switch matrix to the fourth RF port, obtain a second indicator indicating a frequency, frequency range, channel, or band for an RF signal to be carried via the fourth RF port while coupled to the third RF port, obtain, in response to the determination that the third RF port has been selected to be coupled to the fourth RF port, a second adjustment value based on the second indicator, the third RF port, and the fourth RF port, and supply a second control signal to the second amplitude adjustment device to cause the second amplitude adjustment device to select a second amount of attenuation and/or amplification, wherein the second control signal is generated based on the second adjustment value.

The controller may be further configured to receive a gain offset value to be applied to the RF signal to be carried via the second RF port; and either obtain the first adjustment value based on the first indicator, the first RF port, the second RF port, and the gain offset value, or generate the first control signal based on the first adjustment value and the gain offset value.

The communication apparatus may further comprise a temperature sensor, wherein the controller may be further configured to obtain a temperature of the communication apparatus via the temperature sensor; and either obtain the first adjustment value based on the first indicator, the first RF port, the second RF port, and the obtained temperature, or generate the first control signal is generated based on the first adjustment value and the obtained temperature.

In a general aspect, a method of operating a communication apparatus, the method comprising determining that a first RF port has been selected to be coupled via an M by N radio frequency (RF) switch matrix to a second RF port, wherein the M by N radio frequency (RF) switch matrix comprises M first-side RF ports and N second-side RF ports, the first RF port is included in the M first-side RF ports, the second RF port is included in the N second-side RF ports, M is at least 2 and N is at least 2, and each of the first-side RF ports may be selectively coupled to and uncoupled from at least one of two or more of the second-side RF ports, such that RF signals are carried between selectively coupled RF ports; obtaining a first indicator indicating a frequency, frequency range, channel, or band for an RF signal to be carried via the second RF port while coupled to the first RF port; obtaining, in response to the determination that the first RF port has been selected to be coupled to the second RF port, a first adjustment value based on the first indicator, the first RF port, and the second RF port; and causing a first amplitude adjustment device configured to attenuate and/or amplify an RF signal as it passes through the first RF port or the second RF port with a selectable amount of attenuation and/or amplification to select a first amount of attenuation and/or amplification determined based on the first adjustment value.

Particular implementations may include one or more of the following features. The first amplitude adjustment device may be configured to attenuate and/or amplify an RF signal as it passes through the second RF port. The first amplitude adjustment device may be configured to attenuate and/or amplify an RF signal as it passes through the first RF port.

The obtaining the first adjustment value may include obtaining the first adjustment value from a nonvolatile memory included in the communication apparatus. The method may further comprise obtaining, in response to the determination that the first RF port has been selected to be coupled to the second RF port, a second adjustment value based on the first indicator, the first RF port, and the second RF port; and determining the first amount of attenuation and/or amplification based on the first adjustment value and the second adjustment value.

The method may further comprise determining that a third RF port has been selected to be coupled via the RF switch matrix to a fourth RF port, wherein the third RF port is included in the M first-side RF ports and is different from the first RF port, and the fourth RF port is included in the N second-side RF ports and is different from the second RF port; obtaining a second indicator indicating a frequency, frequency range, channel, or band for an RF signal to be carried via the fourth RF port while coupled to the third RF port; obtaining, in response to the determination that the third RF port has been selected to be coupled to the fourth RF port, a second adjustment value based on the second indicator, the first RF port, and the second RF port; and causing a second amplitude adjustment device configured to attenuate and/or amplify an RF signal as it passes through the third RF port or the fourth RF port with a selectable amount of attenuation and/or amplification to select a second amount of attenuation and/or amplification determined based on the second adjustment value.

The method may further comprise determining, after causing the first amplitude adjustment device to select the first amount of attenuation and/or amplification, a third RF port has been selected to be coupled via the RF switch matrix to a third RF port, wherein the third RF port is included in the first-side RF ports and is different from the first RF port; obtaining, after causing the first amplitude adjustment device to select the first amount of attenuation and/or amplification, a second indicator different from the first indicator, the second indicator indicating a frequency, frequency range, channel, or band for an RF signal to be carried via the second RF port while coupled to the third RF port; obtaining, in response to the determination the third RF port has been selected to be coupled to the second RF port, a second adjustment value based on the second indicator, the third RF port, and the second RF port; and causing the first amplitude adjustment device to select a second amount of attenuation and/or amplification determined based on the second adjustment value, wherein the first amplitude adjustment device is configured to attenuate and/or amplify an RF signal as it passes through the second RF port.

The method may further comprise obtaining a temperature of the communication apparatus; and obtaining the first adjustment value based on the first indicator, the first RF port, the second RF port, and the obtained temperature.

A nontransitory computer readable medium may include instructions which, when executed by one or more processors, cause the one or more processors to perform any of the methods described above.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
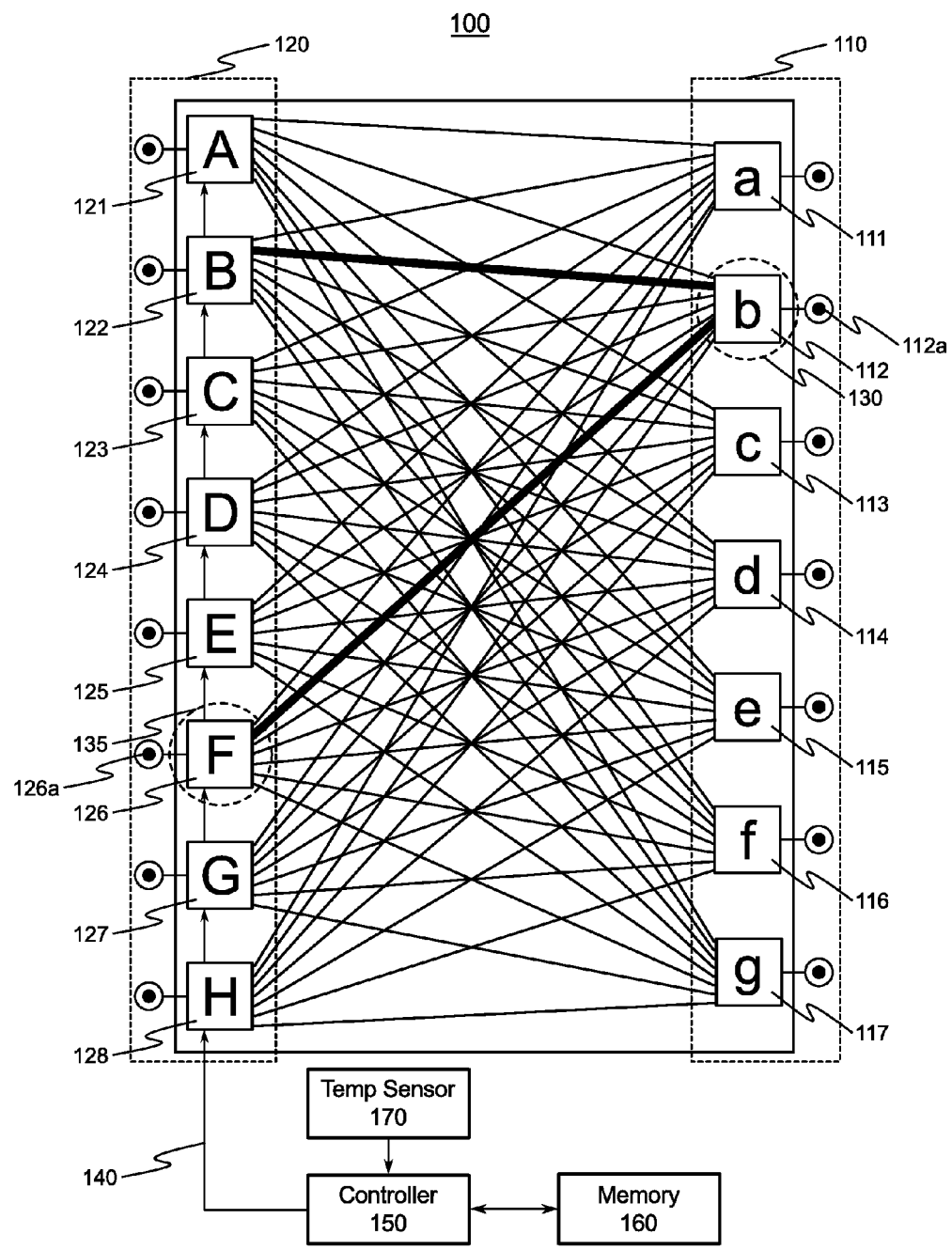
FIG. 1 illustrates a high-level schematic diagram of an RF switch matrix.

FIG. 1 illustrates a high-level schematic diagram of an example of an RF switch matrix 100. RF switch matrix 100 is an M by N switch matrix comprising N first-side RF ports 110 and M second-side RF ports 120. In the example illustrated in FIG. 1, M has a value of 7, and N has a value of 8, although other values for M and N are acceptable. Thus, the example RF switch matrix 100 includes 7 first-side RF ports 110 and 8 second-side RF ports 120.

The 7 first-side RF ports 110 include first-side RF port 111 (labeled "a" throughout the drawings), first-side RF port 112 (labeled "b" throughout the drawings), first-side RF port 113 (labeled "c" throughout the drawings), first-side RF port 114 (labeled "d" throughout the drawings), first-side RF port 115 (labeled "e" throughout the drawings), first-side RF port 116 (labeled "f" throughout the drawings), and first-side RF port 118 (labeled "g" throughout the drawings). The 8 second-side RF ports 120 include second-side RF port 121 (labeled "A" throughout the drawings), second-side RF port 122 (labeled "B" throughout the drawings), second-side RF port 123 (labeled "C" throughout the drawings), second-side RF port 124 (labeled "D" throughout the drawings), second-side RF port 125 (labeled "E" throughout the drawings), second-side RF port 126 (labeled "F" throughout the drawings), second-side RF port 127 (labeled "G" throughout the drawings), and second-side RF port 128 (labeled "H" throughout the drawings). Each of the first-side ports 110 may include an input/output connector, such as input/output connector 112a included in first-side port 112. Each of the second-side ports 120 may include an input/output connector, such as input/output connector 126a included in second-side port 126.

Figure 2:
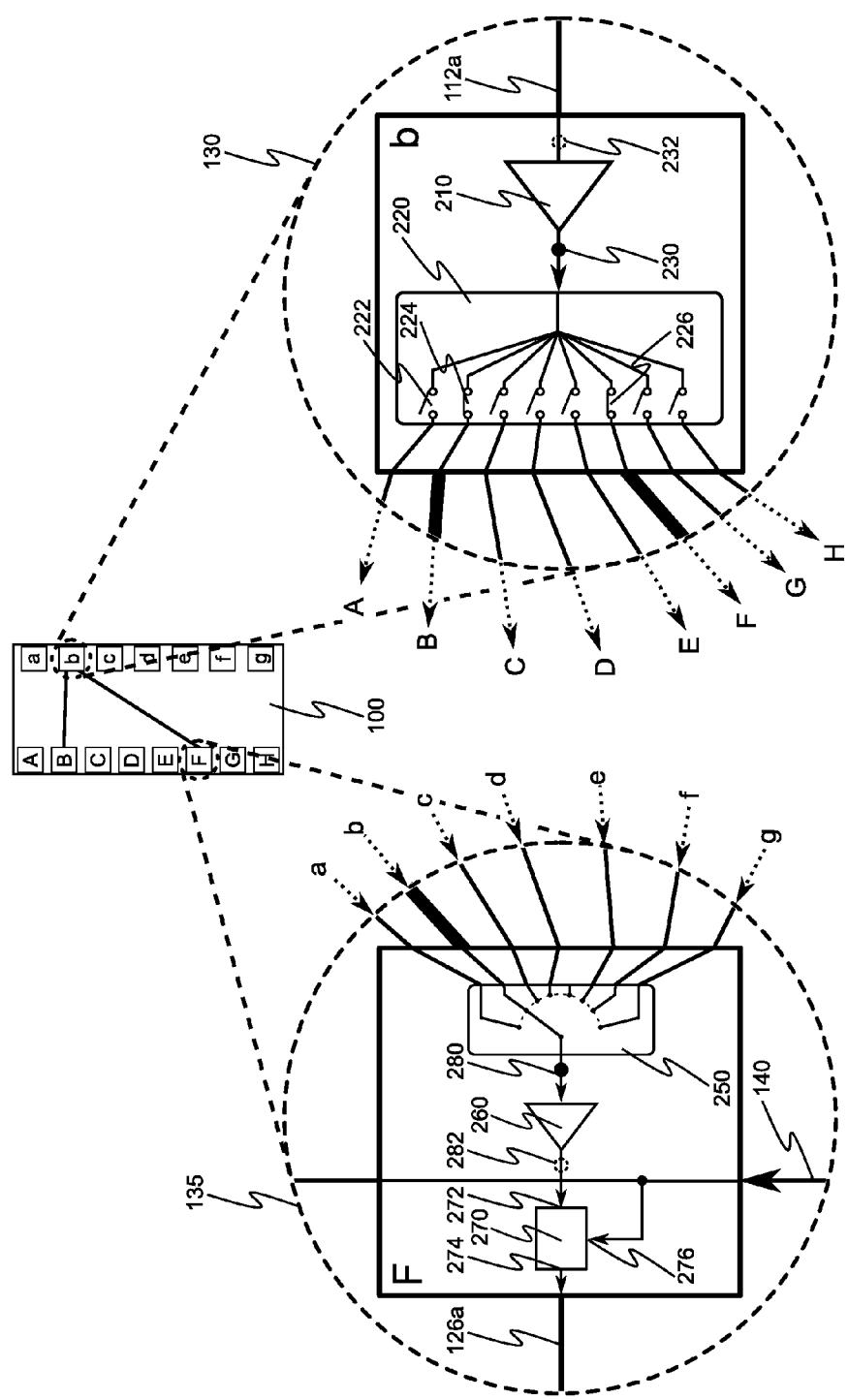
FIG. 2 illustrates example implementations of a first-side RF port and a second-side RF port of an RF switch matrix.
Figure 3:
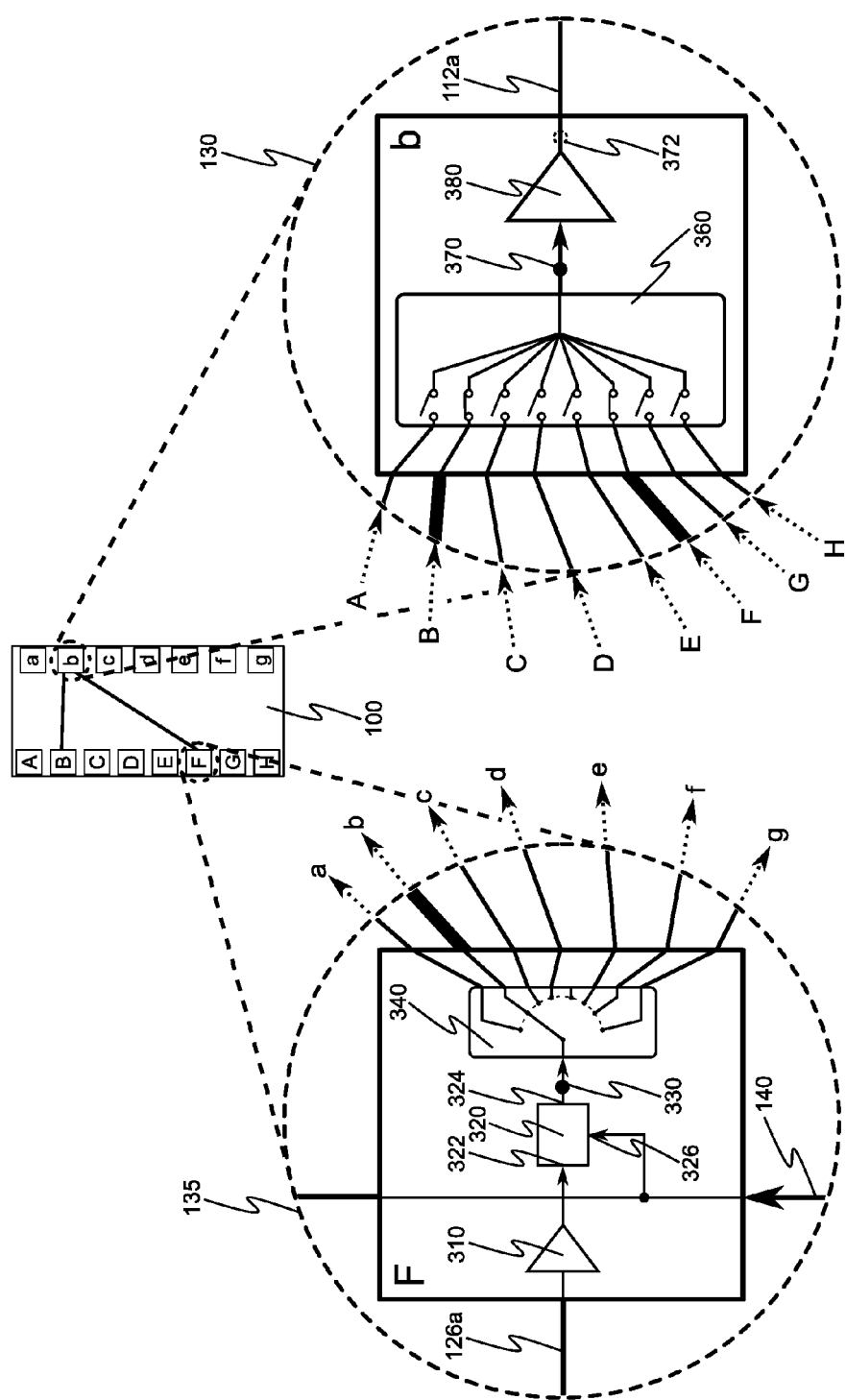
FIG. 3 illustrates example implementations of a first-side RF port and a second-side RF port of an RF switch matrix.
Figure 4:
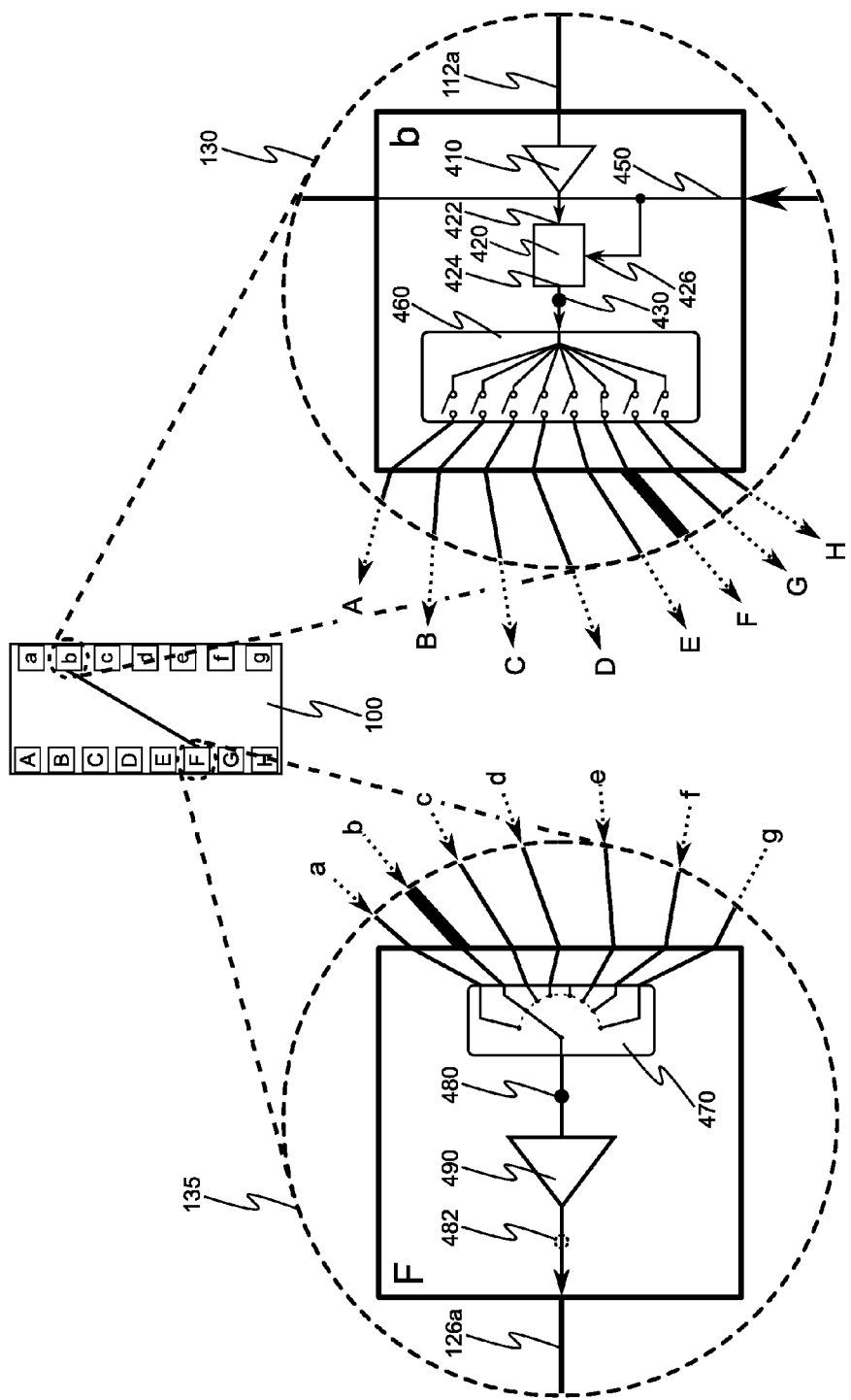
FIG. 4 illustrates example implementations of a first-side RF port and a second-side RF port of an RF switch matrix.

With the RF switch matrix 100, each of the first-side RF ports 110 may be selectively coupled to at least two or more of the second-side RF ports 120. When a first-side RF port 110 has been selectively coupled to a second-side RF port 120, an RF signal may be carried between the two ports. When a first-side RF port 110 is not coupled to a second-side RF port 120, an RF signal may substantially not be carried between the two ports. Much as a first-side RF port 110 can be coupled to a second-side RF port 120, the two coupled ports can also be selectively uncoupled again. In the particular example illustrated in FIG. 1, each of the first-side RF ports 110 is capable of being coupled with each of the eight second-side RF ports 120, as illustrated by the lines passing between the ports. In some implementations, a first-side RF port 110 may be capable of being coupled to two or more, but not all of, the second-side RF ports 120. In this disclosure, terms such as "couple," "coupled," "couples," "coupling," "uncouple," "uncoupled," "uncouples," and "uncoupling" are symmetric; for example, the statement that "the controller causes first-side RF port 113 to be coupled to second-side RF port 122" is equivalent to the statement that "the controller causes second-side RF port 122 to be coupled to first-side RF port 113," and no particular meaning is to be ascribed in which the two coupled RF ports are mentioned. FIGS. 2-4, which are discussed in more detail below, illustrate examples of internal elements of the RF ports, such as for area 130 for first-side RF port b and for area 135 for second-side RF port F.

Figure 5:
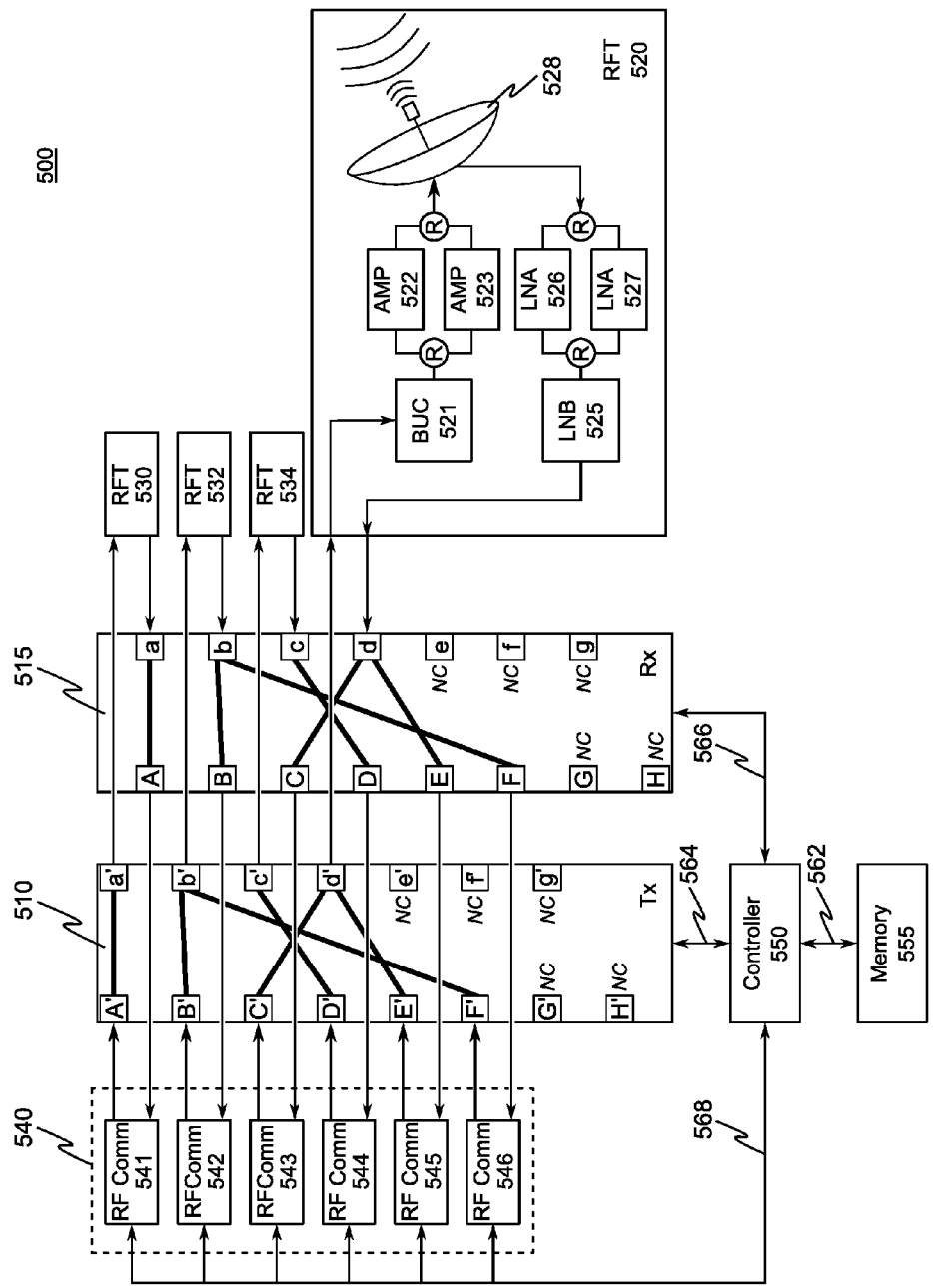
FIG. 5 illustrates an example of an RF system including a transmit RF switch matrix and a receive RF switch matrix.

In some circumstances, a single first-side RF port 110 may not be coupled to any of the second-side RF ports 120. FIG. 5, which is discussed in more detail below, illustrates an example in which the first-side RF ports f is not coupled to any of the second-side RF ports A-H (as indicated by "NC" next to the uncoupled ports). In some circumstances, a single first-side RF port 110 may be coupled to a single second-side RF port 120. FIG. 5, which is discussed in more detail below, illustrates an example in which first-side RF ports a and c are connected to respective second-side RF ports A and D. In some implementations, a single first-side RF port 110 may be simultaneously coupled to two or more second-side RF ports 120. FIG. 5 illustrates an example in which first-side RF port b is simultaneously coupled to two second-side RF ports B and F, and first-side RF port d is simultaneously coupled to two second-side RF ports C and E. Also, FIG. 1 illustrates an example in which first-side RF port b is simultaneously coupled to two second-side RF ports B and F (as indicated by the two darker lines). One situation where it may be useful to couple a single first-side RF port 110 to multiple second-side RF ports is utilizing two data demodulators operating at different frequency bands from a single RF signal. Another situation is where a single transmitting antenna is used to transmit signals in different frequency bands, and separate pieces of RF communication equipment, such as data modulators, are coupled to respective second-side RF ports 120 that themselves are coupled to a single first-side RF port 110.

In some implementations, some or all of the first-side RF ports 110 may be configured, or optimized, for serving as RF inputs, and the second-side RF ports 120 may be configured, or optimized, for serving as RF outputs. Such implementations may include active components along the signal paths among and between the first-side RF ports 110 and second-side RF ports 120 that preclude bidirectional RF signaling. For example, the RF ports of receive RF switch matrix 515 illustrated in FIG. 5 might be configured in this manner.

In some implementations, some or all of the first-side RF ports 110 may be configured, or optimized, for serving as RF outputs, and the second-side RF ports 120 may be configured, or optimized, for serving as RF inputs. Such implementations may include active components along the signal paths among and between the first-side RF ports 110 and second-side RF ports 120 that preclude bidirectional RF signaling. For example, the RF ports of transmit RF switch matrix 510 illustrated in FIG. 5 might be configured in this manner. In some implementations, RF signals may be sent in both directions between a first-side RF port 110 and a second-side RF port 120 that are coupled together.

RF switch matrix 100 may include or be coupled to controller 150. Controller 150 may be capable of sending control signals to each of second-side RF ports 120 via control signal channel 140, as illustrated in FIG. 1. Control channel 140 may be provided by, for example, a serial data bus, a parallel data bus, or separate channels to each of the second-side RF ports 120. Controller 150 may be capable of sending control signals to each of first-side RF ports 110. Controller 150 may be configured to control coupling and uncoupling of first-side RF ports with second-side RF ports. Controller 150 may be configured to obtain instructions and data from memory 160, such as a nonvolatile flash memory unit. Controller 150 may be configured to obtain temperature information for RF switch matrix 100 from temperature sensor 170.

FIGS. 2-4 illustrate various simplified examples of implementations of the RF ports b and F within areas 130 and 135 of FIG. 1. Although the RF ports b and F are illustrated as specific examples, much the same implementations may also be used for RF ports a, c-g, A-E, G, and H. For example, first-side RF ports a and c-g of RF switch matrix 100 illustrated in FIG. 2 may each be implemented in much the same manner as illustrated for first-side RF port b.

FIG. 2 illustrates example implementations of first-side RF port b in area 130 and second-side RF port F in area 135 of RF switch matrix 100. As in FIG. 1, in the example illustrated in FIG. 2, first-side RF port b is simultaneously coupled to two second-side RF ports B and F, as illustrated by the two lines b-B and b-F within the simplified illustration of RF switch matrix 100 and the thicker lines in areas 130 and 135. First-side RF port b may include amplifier 210, which is configured to receive an RF signal via input connector 112a and output the RF signal, with a predetermined amount of amplification, to RF switch array 220 via an RF signal path including first-side RF signal node 230. In some examples, there may be a first-side RF signal node 232, as illustrated by the dashed lines.

RF switch array 220 is configured to receive an RF signal via an RF signal path including first-side RF signal node 230 and/or first-side RF signal node 232, and selectively output the received RF signal to any of its eight outputs, each of which is connected to a respective RF signal path to one of second-side ports A-H. For each of the eight outputs, there is a switching element, such as switching element 222 for the output provided to second-side RF port A, switching element 224 for the output provided to second-side RF port B, and switching element 226 for the output provided to second-side RF port F. The switching elements may be provided by, for example, a semiconductor switching element such as a transistor or a mechanical switching element such as a relay. In the example illustrated in FIG. 2, switching elements 224 and 226 are simultaneously activated, allowing the RF signal received by RF switch array 220 to be carried to second-side RF ports B and F, as also illustrated by the thicker lines in area 130 for their respective RF signal paths. Although not illustrated in FIG. 2 to simply the illustration, RF switch array 220 may be configured to selectively activate and deactivate the switching elements in response to control signals. In some implementations, the control signals may be generated by, or provided via, controller 150. In some implementations, RF switch array 220 may be replaced with a multi-way RF switch, much like the 8-way RF switch 250 illustrated in area 135; however, in such implementations the multi-way RF switch would only be able to selectively output the RF signal to at most one of its outputs at a time. Although the implementation of first-side RF port b in FIG. 2 is configured to be able to provide an RF signal to any of all eight second-side RF ports A-H, in some implementations a first-side RF port may be configured to provide an RF signal to some, but not all of, the second-side RF ports.

Second-side RF port F includes multi-way RF switch 250; in the illustrated implementation, multi-way RF switch 250 is an 8-way RF switch which may be selectively connected to any of its 8 inputs, and may be implemented with an electronically controlled SP8T (single pole, 8 throw) switch. 7 of the 8 inputs are configured to receive signals from respective first-side RF ports a-g, and the remaining eighth input is not connected to any of the first-side RF ports, but instead is, for example, connected to a pull up or pull-down resistor. In the example illustrated in FIG. 2, multi-way RF switch 250 has been set to provide an RF signal received from first-side RF port b to an amplitude adjustment device signal path including second-side RF signal node 280. In some examples, there may be a second-side RF signal node 282 on the amplitude adjustment device signal path, as illustrated by the dashed lines. Although not illustrated in FIG. 2 to simply the illustration, multi-way RF switch 250 may be configured to selectively connect to one of its inputs in response to control signals. In the example illustrated in FIG. 2, multi-way RF switch 250 has selected first-side RF port b, allowing an RF signal provided by first-side RF port b to be carried to second-side RF signal node 280 and/or RF signal node 282, as illustrated by the thicker line in area 130 for first-side RF port b. In some implementations, the control signals may be generated by, or provided via, controller 150. In some implementations, RF switch array 220 may be replaced with an RF switch array, much like the RF switch array 220 illustrated in area 130, allowing second-side RF port F to simultaneously receive RF signals from more than one first-side RF port. Although the implementation of second-side RF port F in FIG. 2 is configured to be able to receive an RF signal from any of all seven first-side RF ports a-g, in some implementations a second-side RF port may be configured to receive an RF signal from some, but not all of, the first-side RF ports. Although areas 130 and 135 illustrate use of RF switch array 220 and multi-way RF switch 250, it is understood that other components may be used to selectively carry RF signals between the first-side RF ports and the second-side RF ports.

In some implementations, each of first-side RF ports a and c-g includes a respective first-side RF signal node much like first-side RF signal node 230 and/or first-side RF signal node 232 in first-side RF port b. In some implementations, each of second-side RF ports A-E, G, and H includes a respective second-side RF signal node much like second-side RF signal node 280 and/or second-side RF signal port 282 in second-side RF port F. By appropriately controlling RF switch array 220 and multi-way RF switch 250, each of the first-side RF signal nodes may be selectively coupled to and uncoupled from at least one of two or more of the second-side RF signal nodes, such that RF signals are carried between coupled RF signal nodes and are substantially not carried between uncoupled RF signal nodes. For example, to couple first-side RF signal node 230 of first-side RF port b to second-side RF signal node 280 of second-side RF port F, which also couples RF ports b and F, while switching element 226 is activated, multi-way RF switch must be set to select the input corresponding to first-side signal port b, as is illustrated in FIG. 2.

Second-side RF port F may include amplifier 260, which is configured to receive an RF signal from multi-way RF switch 250 and output the RF signal, with a predetermined amount of amplification, to RF signal input 272 of amplitude adjustment device 270. Amplitude adjustment device 270 is configured to receive an RF signal via RF input 272 and output the RF signal via RF signal output 274 with a selectable amount of attenuation and/or amplification that is selected in response to a control signal supplied to control signal input 276. There are a many commercially available components suitable for amplitude adjustment device 270, such as, for example, the ADL 5202 31.5 dB range, 0.5 dB step size programmable variable gain amplifier (VGA) by Analog Devices, which offers −11.5 to +20 dB gain range; the RFSA2624 6-bit digital step attenuator (DSA) by RFMD, which offers a 31.5 dB gain control range with a 0.5 dB step size; the AT20-0106 digital step attenuator (DSA) by MACOM, with a 1 dB minimum step size and 50 dB total attenuation; and the HMC792A digital step attenuator (DSA) by Analog Devices, which offers a 15.75 dB attenuation range in 0.25 dB steps. In some implementations, amplitude adjustment device 270 may be implemented using a plurality of separate or discrete components, such as, but not limited to, resistor divider networks and switching elements such as transistors. The RF signal input 272 of amplitude adjustment device 270 has an amplitude adjustment device signal path from second-side RF signal node 280 and/or second-side RF signal node 282. The RF signal output 274 provides the amplified and/or attenuated RF signal to output connector 126a. Amplitude adjustment device 270 receives control signals, for selecting an amount of amplification and/or attenuation, which are provided to control signal input 276 via control channel 140. Amplitude adjustment device 270 may be configured to process control signals received via, for example, a parallel or serial data bus.

FIG. 3 illustrates example implementations of first-side RF port b in area 130 and second-side RF port F in area 135 of RF switch matrix 100. As in FIG. 1, in the example illustrated in FIG. 3, first-side RF port b is simultaneously coupled to two second-side RF ports B and F, as illustrated by the two lines b-B and b-F within the simplified illustration of RF switch matrix 100 and the thicker lines in areas 130 and 135. The implementation illustrated in FIG. 3 includes elements similar to the elements discussed with respect to FIG. 2. For the sake of conciseness, detailed descriptions of these elements are not repeated; instead, various differences will be highlighted. It should be apparent in view of the discussion of FIG. 2 how the implementation illustrated in FIG. 3 operates and is operated relative to the implementation illustrated in FIG. 2.

In the implementation illustrated in FIG. 3, second-side RF port F may include amplifier 310, which is configured to receive an RF signal via input connector 126a and output the RF signal, with a predetermined amount of amplification, to RF input 322 of amplitude adjustment device 320, which operates and is controlled in much the same manner as amplitude adjustment device 270. Control signal input 326 operates in much the same manner as control signal input 276, and receives control signals via control channel 140. RF output 324 of amplitude adjustment device 320 is configured to output the amplified and/or attenuated RF signal to the amplitude adjustment device signal path including second-side RF signal node 330. Multi-way RF switch 340 operates and is controlled in much the same manner as multi-way RF switch 250; however, rather than providing a multi-way input, multi-way RF switch 340 provides a selectable multi-way output of an RF signal received from second-side RF signal node 330. In the illustrated example, 7 of the 8 outputs of multi-way RF switch 340 are provided to respective first-side RF ports a-g, and the eighth out provides a "no connect" option for second-side RF port F. In the example illustrated in FIG. 3, multi-way RF switch 250 has selected first-side RF port b, allowing an RF signal provided via second-side RF signal node 330 to be carried to first-side RF port b, as illustrated by the thicker line in area 130 for first-side RF port b.

In area 130 of FIG. 3, RF switch array 360 operates and is controlled in much the same manner as RF switch array 220; however, rather than providing multiple outputs to the first-side RF ports, RF switch array 360 includes a plurality of inputs, of which zero, one, or more may be output to first-side RF signal node 370. In some examples, there may be a first-side RF signal node 372, as illustrated by the dashed lines. In the example illustrated in FIG. 2, switching elements corresponding to second-side RF ports B and F are simultaneously activated, allowing RF signals provided from second-side RF ports B and F to be carried to first-side RF signal node 370 and/or first-side RF signal node 372, as also illustrated by the thicker lines in area 130 for their respective RF signal paths. First-side RF port b may include amplifier 380, which is configured to receive an RF signal via an RF signal path including first-side RF signal node 370 and output the RF signal, with a predetermined amount of amplification, to output connector 112a.

In some implementations of RF switch matrix 100, some of the first-side RF ports may be configured much like first-side RF port b illustrated in FIG. 2, and others of the first-side RF-ports configured like first-side RF port b illustrated in FIG. 3. Additionally, some of the second-side RF ports may be configured much like second-side RF port F illustrated in FIG. 2, and others of the second-side RF-ports configured like second-side RF port F illustrated in FIG. 3. It should be apparent, however, that in such implementations that a first-side RF port like first-side RF port b illustrated in FIG. 2 would not be suitable for coupling with a second-side RF port like second-side RF port F illustrated in FIG. 3, and likewise a first-side RF port like first-side RF port b illustrated in FIG. 3 would not be suitable for coupling with a second-side RF port like second-side RF port F illustrated in FIG. 2.

FIG. 4 illustrates example implementations of first-side RF port b in area 130 and second-side RF port F in area 135 of RF switch matrix 100. In the example illustrated in FIG. 4, first-side RF port b is coupled to one second-side RF port and F, as illustrated by the line b-F within the simplified illustration of RF switch matrix 100 and the thicker lines in areas 130 and 135. The implementation illustrated in FIG. 4 includes elements similar to the elements discussed with respect to FIG. 2. For the sake of conciseness, detailed descriptions of these elements are not repeated; instead, various differences will be highlighted. It should be apparent in view of the discussion of FIG. 2 how the implementation illustrated in FIG. 4 operates and is operated relative to the implementation illustrated in FIG. 2.

In the implementation illustrated in FIG. 4, first-side RF port b may include amplifier 410, which is configured to receive an RF signal via input connector 112a and output the RF signal, with a predetermined amount of amplification, to RF input 422 of amplitude adjustment device 420, which operates and is controlled in much in the same manner as amplitude adjustment device 270. Control signal input 426 operates in much the same manner as control signal input 276, and receives control signals via control channel 450, which is much like control channel 140 discussed with respect to FIGS. 1-3. RF output 424 of amplitude adjustment device 420 is configured to output the amplified and/or attenuated RF signal to the amplitude adjustment device signal path including first-side RF signal node 430. RF switch array 460 operates and is controlled much like RF switch array 220. In the example illustrated in FIG. 4, a switching element included in RF switch array 460 corresponding to a signal path to second-side RF port F is activated, allowing the RF signal received by RF switch array 460 to be carried to second-side RF port F, as also illustrated by the thicker line in area 130 for the respective RF signal path.

In area 135 of FIG. 4, multi-way RF switch 470 operates and is controlled in much the same manner as multi-way RF switch 250, and produces its output to second-side RF signal node 480 and/or second-side RF signal node 482. Second-side RF port F may also include amplifier 490, which is configured to receive an RF signal from multi-way RF switch 470 and output the RF signal, with a predetermined amount of amplification, to output connector 226a. Although not specifically illustrated in FIGS. 2-4, in some implementations, the first-side RF ports 110 and second-side RF ports may be configured to allow bidirectional transfer of signals.

FIG. 5 illustrates an example of an RF system 200 including a transmit RF switch matrix 510 and a receive RF switch matrix 515. The particular example illustrated in FIG. 5 is adapted for satellite data communication. However, this merely serves as an example, and the subject matter described in this disclosure is not limited to satellite data communications, but is more broadly applicable to other RF communication systems. The illustrated transmit RF switch matrix 510 is a 7 by 8 RF switch matrix. The illustrated receive RF switch matrix 515 is also a 7 by 8 switch RF matrix. Other values of M and N may be used. Although in the particular example illustrated in FIG. 5 the values of M and N are the same for transmit RF switch matrix 510 and receive RF switch matrix 515, in some implementations, these two switch matrices could have different values of M and/or N. In the example illustrated in FIG. 5, transmit RF switch matrix 510 is configured such that first-side RF port a' is coupled with second-side RF port A', first-side RF port b' is simultaneously coupled with second-side RF ports B' and F', first-side RF port c' is coupled with second-side RF port D', and first-side RF port d' is simultaneously coupled with second-side RF ports C' and E'. Also, receive RF switch matrix 515 is configured such that first-side RF port a is coupled with second-side RF port A, first-side RF port b is simultaneously coupled with second-side RF ports B and F, first-side RF port c is coupled with second-side RF port D, and first-side RF port d is simultaneously coupled with second-side RF ports C and E. As discussed below, system 500 is configured such that coupling and uncoupling of RF ports in transmit RF switch matrix 510 are reflected in receive RF switch matrix 515 and/or vice-versa. In some implementations, the two RF switch matrices 510 and 515 may be replaced with a single RF switch matrix, for example, a 14 by 16, or even a 10 by 14, RF switch matrix.

First-side RF ports a-d and a'-d' are coupled to RFTs (radio frequency terminals) 520, 530, 532, and 534. More specifically, an RF input of RFT 530 is coupled to first-side RF port a', and an RF output of RFT 530 is coupled to first-side RF port a; an RF input of RFT 532 is coupled to first-side RF port b', and an RF output of RFT 532 is coupled to first-side RF port b; an RF input of RFT 534 is coupled to first-side RF port c', and an RF output of RFT 534 is coupled to first-side RF port c; and an RF input of RFT 520 is coupled to first-side RF port d', and an RF output of RFT 520 is coupled to first-side RF port d. First-side RF ports e, f, g, e', f', and g' remain uncoupled, as indicated by the "NC" labels.

FIG. 5 illustrates specific elements of RFT 520. Block upconverter (BUC) 521 is coupled to first-side RF port d' of transmit RF switch matrix 510, from which BUC 521 receives RF signals modulated by the pieces of active RF communication equipment 543 and 545. An output of BUC 521 is supplied to inputs of redundant high-power amplifiers 522 and 523, the output of which is supplied to satellite dish 528 for transmission to a satellite. RF signals received by satellite dish 528 are supplied to redundant low-noise amplifiers (LNAs) 526 and 527, the output of which is supplied to low-noise block downconverter (LNB) 525. The output of LNB 525 is coupled to first-side RF port d of receive RF switch matrix 215. There are many other well-known configurations for RFTs for satellite communication. Each of RFTs 530, 532, and 534 may be configured in much the same manner as RFT 520.

RF system 500 also includes pieces of RF communication equipment 540, each of which is coupled to respective second-side RF ports of transmit RF switch matrix 510 and receive RF switch matrix 515. An example of a piece of RF communication equipment is a satellite data modem, which is configured to both receive and transmit RF signals; however, some pieces of RF communication equipment may be transmit-only or receive-only. An RF output of a piece of RF communication equipment 541 is coupled to second-side RF port A', and an RF input of the piece of RF communication equipment 541 is coupled to second-side RF port A. An RF output of a piece of RF communication equipment 542 is coupled to second-side RF port B', and an RF input of the piece of RF communication equipment 542 is coupled to second-side RF port B. An RF output of a piece of RF communication equipment 543 is coupled to second-side RF port C', and an RF input of the piece of RF communication equipment 543 is coupled to second-side RF port C. An RF output of a piece of RF communication equipment 544 is coupled to second-side RF port D', and an RF input of the piece of RF communication equipment 544 is coupled to second-side RF port D. An RF output of a piece of RF communication equipment 545 is coupled to second-side RF port E', and an RF input of the piece of RF communication equipment 545 is coupled to second-side RF port E. An RF output of a piece of RF communication equipment 546 is coupled to second-side RF port F', and an RF input of the piece of RF communication equipment 546 is coupled to second-side RF port F.

Figure 10:
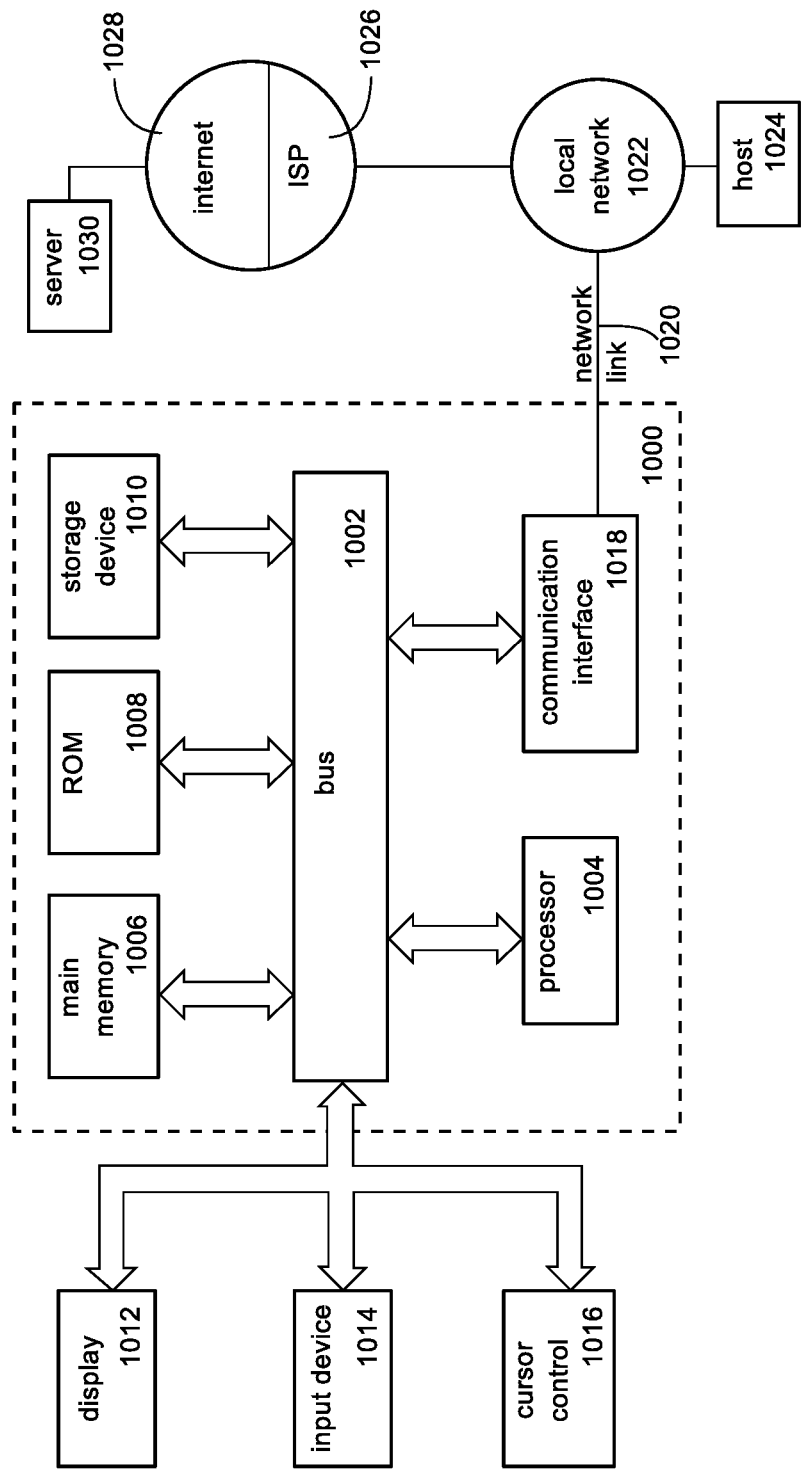
FIG. 10 illustrates a block diagram of a computer system upon which aspects of this disclosure may be implemented

RF system 200 also includes controller 550, which in some implementations may also be referred to and/or implemented as a control unit, a switch control unit, a switch matrix control unit, a switch controller, a switch matrix controller, a switch processor, a switch matrix processor, or a microprocessor unit. The discussion of FIG. 10 provides various suitable implementations for controller 550. Controller 550 is adapted to automatically control amplitude adjustment devices included in RF switch matrices 510 and 515, much as discussed with respect to controller 140; however, it may be further configured to control other aspects of the operation of RF switch matrices 510 and 515, such as by automatically instructing and/or causing RF switch matrices 510 and 515 to couple and uncouple various first-side RF ports and second-side RF ports. Controller 550 interacts with and controls the operation of transmit RF switch matrix 510 via interface 564, and controller 550 interacts with and controls the operation of receive RF switch matrix 515 via interface 566. Although a single controller 550 is illustrated in FIG. 5, in some implementations RF switch matrices 510 and 515 may have separate respective controllers. Additionally, controller 550 may be adapted to obtain information regarding, and in some implementations control the operation of, pieces of RF communication equipment 540 coupled to the second-side ports of the RF switch matrices 510 and 515. Controller 550 may interact with and control the operation of the pieces of RF communication equipment 540 via interface 568. For example, controller 550 may be configured to obtain from one of the pieces of RF communication equipment 540, via interface 568, an indicator indicating a frequency, frequency range, channel, or band for an RF signal being used by the piece of RF communication equipment 540. Interfaces 564, 566, and 568 may each comprise individual connections, a single bus, a data communication network, or other data communication mechanisms. In some implementations, controller 550 may also be adapted to interact with and/or control the operation of RFTs 520, 530, 532, and 534. Controller 560 may be configured to control various elements of RF system 500 to perform operations, such as the various operations discussed in this application, by way of data and/or instructions included in nontransitory computer readable medium including instructions and data which cause one or more processors included in controller 550 to perform the operations. Memory 555, which exchanges data with controller 550 via interface 562, may provide such a nontransitory computer readable medium. In some implementations, transmit RF switch matrix 510, receive RF switch matrix 515, and controller 560 may be combined within a single housing or enclosure.

Figure 6:
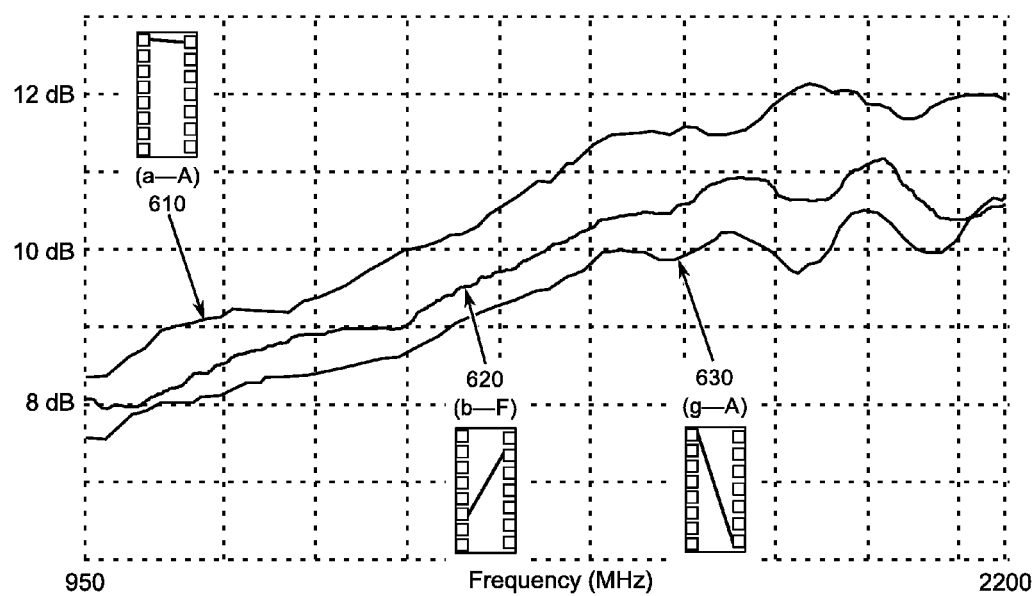
FIG. 6 illustrates examples of how a frequency response of an RF switch matrix can vary according to which first-side RF port and which second-side RF port an RF signal is carried through the RF switch matrix.

FIG. 6 illustrates examples of how a frequency response of an RF switch matrix can vary according to which first-side RF port and which second-side RF port an RF signal is carried through the RF switch matrix. The frequency response may also be viewed as how gain applied by the RF switch matrix varies with frequency. The x-axis of the illustrated graph, as it extends from left to right, corresponds with increasing frequency. The y-axis of the illustrated graph corresponds with a measured level of gain, or the frequency response. Plot 610 corresponds to an example in which RF signals with a range of frequencies are input at first-side RF port a while it is coupled to second-side RF port A (as illustrated by the label a-A and the line in the accompanying simplified RF switch matrix diagram), and accordingly are output via second-side RF port A with the indicated amount of gain. Plot 620 corresponds to an example in which RF signals with a range of frequencies are input at first-side RF port b while it is coupled to second-side RF port F (as illustrated by the label b-F and the line in the accompanying simplified RF switch matrix diagram), and accordingly are output via second-side RF port F with the indicated amount of gain. Plot 630 corresponds to an example in which RF signals with a range of frequencies are input at first-side RF port g while it is coupled to second-side RF port A (as illustrated by the label g-A and the line in the accompanying simplified RF switch matrix diagram), and accordingly are output via second-side RF port A with the indicated amount of gain. There are many well-known techniques for obtaining frequency response information such as the information used to generate plots 610, 620, and 630.

The gain measured for coupling a-A (illustrated by plot 610) is greater than the gain measured for coupling b-F (illustrated by plot 620) at all of the illustrated frequencies. Also, in general, the gain measured for coupling b-F is greater than the gain measured for coupling g-A (illustrated by plot 630), with an exception at higher frequencies. Although this may in part be attributed to increasingly longer signal paths for couplings a-A, b-F, and g-A, variations in frequency response from one coupling of a first-side RF port and a second-side RF port to coupling (of which there are 56 couplings for the illustrated 7 by 8 RF switch matrix, as illustrated by the lines connecting the RF ports in FIG. 1) may also result from manufacturing and component variations. As a result, different frequency responses may be observed between two similar couplings, such as a-A and b-B, and two different frequency responses may be observed for the same coupling, such as b-F, between two different RF switch matrices of the same design.

Additionally, each of plots 610, 620, and 630 demonstrate significant gain variation over the measured range of frequencies. For example, plot 610 exhibits gain ranging from approximately +8.3 dB to approximately +12.2 dB—a range of 3.9 dB. Plot 630 exhibits gain ranging from approximately +7.6 dB to approximately +10.7 dB—a range of 3.1 dB. Additionally, variations in the frequencies and magnitudes of peaks (or local maxima) and valleys (or local minima) in the plots 610, 620, and 630 can also be observed. None of the plots 610, 620, and 630 demonstrate a "flat" or approximately flat frequency response.

Figure 7:
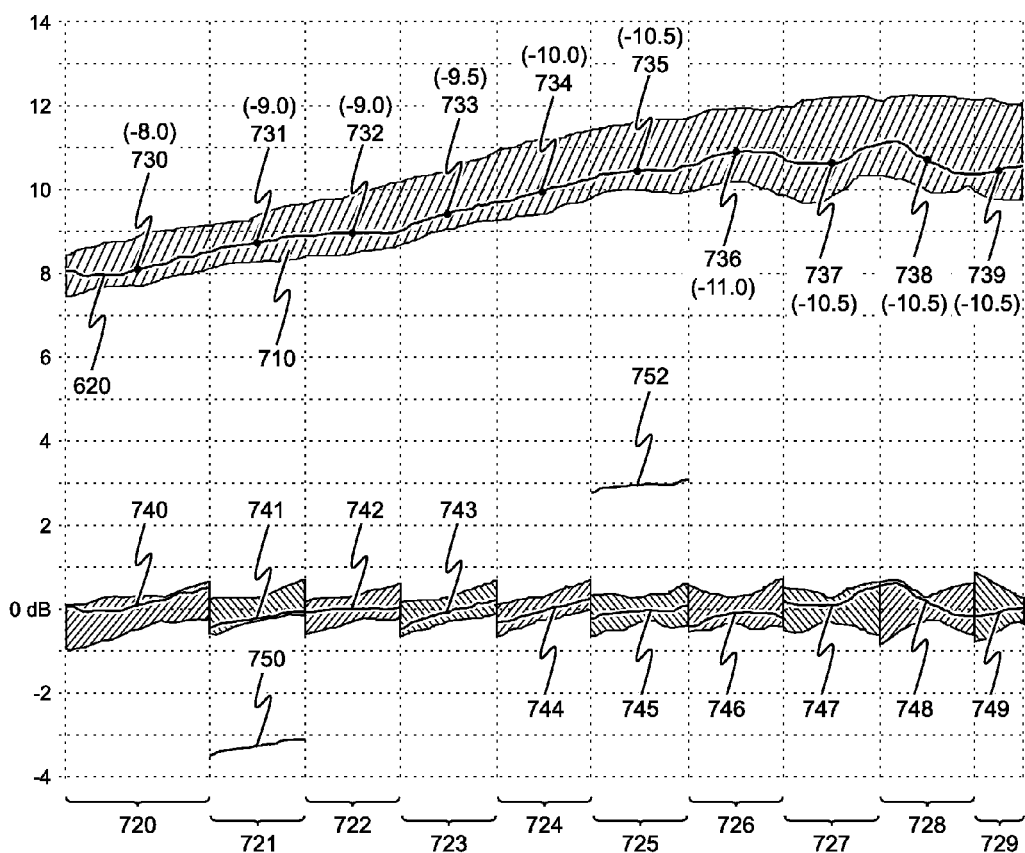
FIG. 7 illustrates initial overall and specific frequency responses of an RF switch matrix, and adjustments to both the overall and specific frequency responses.

FIG. 7 illustrates initial overall and specific frequency responses of an RF switch matrix, and adjustments to both the overall and specific frequency responses. Plot 620 illustrates the same frequency response plot for the coupling b-F illustrated in FIG. 6. The shaded region surrounding plot 620 illustrates the original overall frequency response 710 for all 56 different couplings of the RF switch matrix 100. The original overall frequency response 710 shows both the maximum gain and the minimum gain at each measured frequency among the measurements made for all of the 56 available couplings. Generally, neither the top line nor the bottom line of the original overall frequency response 710 represents the frequency response of any single coupling, but instead usually include minima or maxima measured for multiple different couplings.

Along the x-axis of FIG. 7, which represents a frequency at which a gain measurement was made, the illustrated range of frequencies has been divided into ten frequency bands 720-729. The frequency bands may be of differing widths. For each of the frequency bands 720-729, gain measurements 730-739 for the coupling b-F are shown, each of which was measured at a center frequency of each of the frequency bands 720-729. In some implementations, a gain measurement value for a band may be an average of gain measurements at multiple frequencies within the band. Similar frequency response measurements can be made for all 56 available couplings to characterize frequency response of each available coupling in the RF switch matrix at the center frequencies of RF bands 720-729. Although FIG. 7 only illustrates one gain measurement for each of bands 720-729, there may be multiple gain measurements for a band. Also, a frequency response for each coupling may be determined by measuring the gain at various points across the entire frequency range of interest; for example, gain measurements taken at increments of 10 MHz, 50 MHz, or 100 MHz, although the measurements may be spaced unevenly.

There are many techniques that may be used for obtaining gain measurements for the different couplings available in an RF switch matrix. One technique is to supply control signals to each of the amplitude adjustment devices in an RF switch matrix to apply the same amount of attenuation and/or amplification (for example, a 0 dB mount of gain adjustment), and for each of the couplings available in the RF switch matrix (such as the 56 couplings available in the example illustrated in FIG. 1) perform a plurality of gain measurements at various frequencies. Additionally, if a temperature sensor is available, the gain measurements may be repeated with the RF switch matrix operating at a plurality of different temperatures to record and later make use of gain variations resulting from changes in temperature. If temperature is also used during characterization, the result may be an M×N×K×T array of adjustment values, where M is the number of first-side RF ports, N is the number of second-side RF ports, K is the number of adjustment values recorded for each coupling, and T is the number of different temperatures at which characterization was performed.

By characterizing an RF switch matrix in such a manner, adjustment values may be determined based on the gain measurements, and the adjustment values may be recorded, such as in memory 160 or memory 555. The adjustment values may also be referred to as "calibration values" or "characterization values." The adjustment values may be stored in a nonvolatile memory unit included in a communication apparatus including the RF switch matrix, allowing the adjustment values determined for a particular RF switch matrix to physically accompany the RF switch matrix. In FIG. 7, example adjustment values are shown in parentheses for the coupling b-F for an RF switch matrix comprising amplitude adjustment devices having a 0.5 dB step size (meaning that an amount of attenuation or amplification applied by each of the amplitude adjustment devices can be adjusted in increments of 0.5 dB). For example, for band 720, the gain measurement 730 of approximately 8.1 dB has a corresponding adjustment value of −8.0 dB (the 0.5 dB step that when applied to gain measurement 730 yields the sum closest to 0 dB). As another example, for band 723, the gain measurement 733 of approximately 9.4 dB has a corresponding adjustment value of −9.5 dB.

Characteristics of amplitude adjustment devices may vary from device to device and an amount of attenuation and/or amplification actually realized by an amplitude adjustment device may vary based on frequency and/or the amount of attenuation (for example, a particular amplitude adjustment device, after receiving a control signal to attenuate an RF signal by 6.0 dB, might actually attenuate a 1 GHz signal by 5.5 dB and attenuate a 2 GHz signal by 7.5 dB, and there may be a greater frequency-dependent variation with 20 dB of attenuation versus 6 dB of attenuation). One technique to accommodate such variations is to, for each frequency that is being characterized, set an amplitude adjustment device to various amounts of attenuation and/or amplification and identify the setting that best obtains a desired gain level (such as 0.0 dB, as illustrated in FIG. 7) and base the adjustment value on the resulting setting.

There are many examples and forms in which adjustment values may be recorded in a memory. Adjustment values may include values or quantized values of gain measurements or differences between gain measurements. Adjustment values may include values or quantized values which are −1× the gain measurements, such as the adjustment values illustrated in FIG. 7 in which negative values indicate an amount of attenuation to be applied, and positive values indicate an amount of amplification to be applied. Adjustment values may include coefficients for, other otherwise describe, linear, polynomial, logarithmic, and/or trigonometric (for example) approximations of gain measurements for one or more couplings or differences between gain measurements for one or more couplings. Adjustment values may include coefficients for or descriptions for multiple approximations, such as a series of adjoining Bezier curves, of gain measurements for a single coupling. Adjustment values may be stored in the form of a control signal or a portion of a control signal sent to an amplitude adjustment device. For example, if an amplitude adjustment device with a range of −20 dB to +11.5 dB and a 0.5 dB step size is configured to receive a 6-bit control signal with −20 dB encoded as "000000" (binary) and +11.5 dB encoded as "111111," the adjustment value of −9.5 dB for band 723 may be stored as "010101". Adjustment values may be stored in an M×N×K array, with M being the number of first-side RF ports, N being the number of second-side RF ports, and K being the number of adjustment values stored for each coupling available among the M×N combinations of the first-side and second-side RF ports.

A controller, such as controller 140 or controller 555, is configured to determine that a first, first-side, RF port has been selected to be coupled to a second, second-side, RF port via the RF switch matrix. This determination may be based on, for example, an instruction provided to the controller to cause the first and second RF ports to be coupled, or the controller automatically determining that the first and second RF ports are to be, have been, or will be coupled. The controller is further configured to obtain an indicator indicating a frequency, frequency range, channel, or band for an RF signal to be carried via the second RF port while coupled with the first RF port. For example, the indicator may include a single frequency such as a center frequency of a channel or band, a minimum frequency and a maximum frequency indicating a frequency range, an identifier for an RF channel (for example, channel 51), or an identifier for an RF band. The controller may be further configured to, in response to the determination that the first RF port has been selected to be coupled with the second RF port, obtain one or more adjustment values from the memory based on the indicator, the selected first-side RF port (in other words, which particular first-side RF port among multiple first-side RF ports is being coupled), and the selected second-side RF port (in other words, which particular second-side RF port among multiple second-side RF ports is being coupled to the selected first-side RF port).

Figure 8:
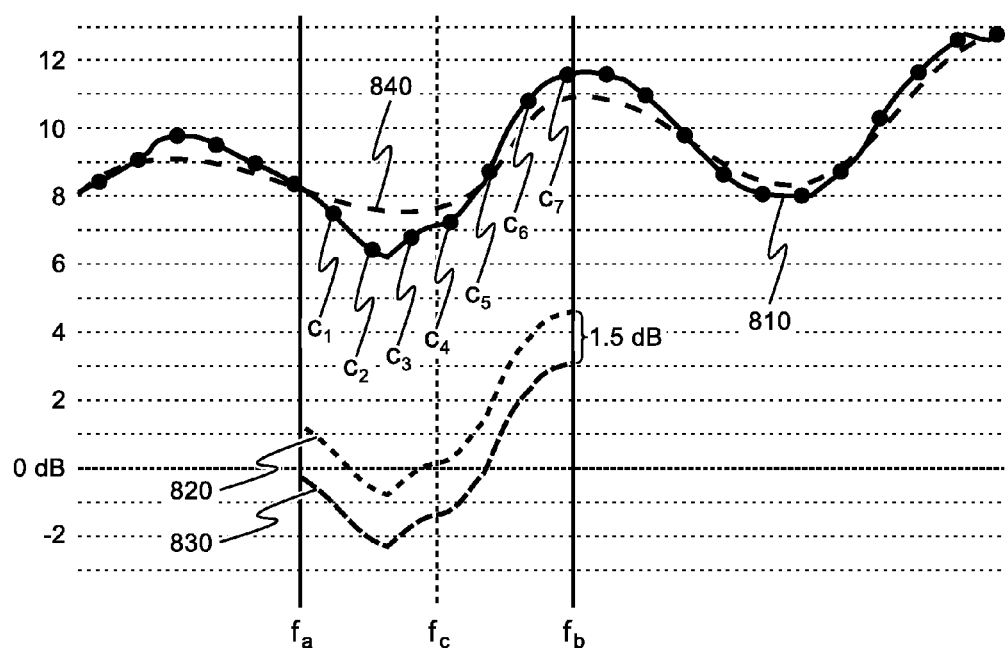
FIG. 8 illustrates aspects of multiple examples of obtaining and processing one or more adjustment values.

FIG. 8 illustrates aspects of multiple examples of obtaining and processing one or more adjustment values. Plot 810 illustrates a portion of a frequency response for a coupling between a particular first-side RF port and a particular second-side RF port. The circles along plot 810 represent adjustment values, including adjustment values $c_1$ through $c_7$, which represent gain measurements obtained for the coupling during characterization. In a first set of examples, a controller may obtain an indicator indicating the single frequency $f_c$ for the particular second-side RF port. Based on the selected first-side RF port and the selected second-side RF port (which together identify a coupling), and the frequency $f_c$, the controller may obtain one or more adjustment values from a memory storing the adjustment values. For example, the controller may obtain the one adjustment value with the closest frequency to frequency $f_c$, adjustment value $c_4$, and use adjustment value $c_4$ to determine an amount of attenuation and/or amplification (for example, if $c_4$ is 7.2 dB, attenuation by 7.0 dB). In another example, the controller may obtain the two adjustment values on each side of $f_c$, adjustment values $c_3$ and $c_4$, and obtain an average of $c_3$ and $c_4$ or interpolate an intermediate value for frequency $f_c$ to determine an amount of attenuation and/or amplification. In another example, the controller may obtain the adjustment values within a predetermined range of frequency $f_c$, for example adjustment values $c_1$ through $c_7$, and average the obtained adjustment values to determine an amount of attenuation and/or amplification. In a second set of examples, a controller may obtain an indicator indicating a channel or band, and adjustment values may available for each channel or band without the need to average or interpolate adjustment value.

In a third set of examples, a controller may obtain an indicator indicating a frequency range, with a minimum frequency $f_a$ and a maximum frequency $f_b$ for the particular second-side RF port. In one example, the controller may determine a center frequency $f_c$ for the range, obtain the one adjustment value with the closest frequency to frequency $f_c$, adjustment value $c_4$, and use adjustment value $c_4$ to determine an amount of attenuation and/or amplification. Plot 820 illustrates a frequency response for the coupling after the adjustment value $c_4$ of 7.2 dB is used to generate a control signal supplied to an amplitude adjustment device through which an RF signal passes through either the particular first-side RF port or the particular second-side RF port for the coupling to cause the amplitude adjustment device to attenuate the RF signal by 7.0 dB (the 0.5 dB step of attenuation that comes closest to a net gain of 0 dB, assuming the amplitude adjustment device has a 0.5 dB step size). In another example, the controller may obtain all of the adjustment values between the minimum frequency $f_a$ and the maximum frequency $f_b$, adjustment values $c_1$ through $c_7$, and determine an amount of attenuation and/or amplification based on the plurality of obtained adjustment values. Plot 830 illustrates a frequency response for the coupling after an average of adjustment values $c_1$ through $c_7$, which is approximately 8.46 dB, is used to generate a control signal supplied to the amplitude adjustment device to cause the amplitude adjustment device to attenuate the RF signal by 8.5 dB (the 0.5 dB step of attenuation that comes closest to a net gain of 0 dB). The 1.5 dB difference between the two plots 820 and 830 illustrates that a significant difference may result from using different techniques for obtaining and processing adjustment values.

In a fourth set of examples, the adjustment values stored for the coupling may be coefficients for, or otherwise describe, an approximation 840 of the gain measurements obtained along plot 810. In one example, a controller may obtain an indicator indicating a single frequency $f_c$ for the particular second-side RF port. The controller may then use a value calculated using the approximation for frequency $f_c$ to generate a control signal supplied to the amplitude adjustment device to cause the amplitude adjustment device to attenuate the RF signal. In another example, the controller may obtain an indicator indicating a frequency range, with a minimum frequency $f_a$ and a maximum frequency $f_b$ for the particular second-side RF port, and calculate an average approximated value between frequencies $f_a$ and $f_b$ to generate a control signal supplied to the amplitude adjustment device to cause the amplitude adjustment device to attenuate the RF signal. This may result in a different amount than would be obtained by simply using the center frequency $f_c$.

Additionally, if the RF switch matrix was characterized at a plurality of temperatures, and respective sets of adjustment values are stored in the memory, the controller may obtain a temperature of the communication apparatus including the RF switch matrix, and utilize the obtained temperature to identify the one of the sets of adjustment values having an associated temperature closest to the obtained temperature. Also, the controller may identify two sets of adjustment values, and interpolate or extrapolate one or more adjustment values based on the obtained temperature.

Returning to FIG. 7, plots 740-749, corresponding to respective bands 720-729, illustrate an adjusted frequency response for plot 620 (for the coupling b-F), where for each of bands 720-729 the respective adjustment value (shown in parentheses) was used to generate a control signal for an amplitude adjustment device included in first-side RF port b or second-side RF port F to cause the amplitude adjustment device to attenuate an RF signal by an amount corresponding to the adjustment value while the RF signal passes through the second-side RF port F while it is coupled to first-side RF port b. For the illustration in FIG. 8, the amplitude adjustment device has a step size of 0.5 dB. For example, while an RF signal in band 720 is being passed through the coupling b-F, the controller supplies a control signal to the amplitude adjustment device to attenuate the RF signal by 8.0 dB. As a result, the frequency response in band 720, illustrated by plot 740, ranges from a minimum of −0.1 dB to a maximum of 0.5 dB. As another example, while an RF signal in band 725 is being passed through the coupling b-F, the controller supplies a control signal to the amplitude adjustment device to attenuate the RF signal by 10.5 dB. As a result, the frequency response in band 735, illustrated by plot 745, ranges from a minimum of −0.1 dB to a maximum of 0.2 dB. By similarly controlling the amplitude adjustment device across each of bands 720-729, the adjusted frequency response is illustrated by plots 740-749, which have a response spanning 1.0 dB, from a minimum of −0.4 dB and a maximum of 0.6 dB—a significant and substantial improvement over the original range of 3.3 dB, from a minimum of 7.9 dB to a maximum of 11.2 dB. The shaded regions around plots 740-749 illustrate an adjusted overall frequency response for all 56 couplings of the 7 by 8 switch matrix. In comparison to the original overall frequency response 710, spanning 4.8 dB, from a minimum of 7.5 dB to a maximum of 12.3 dB, the adjusted overall frequency response only spans 1.8 dB, from a minimum of −1.0 dB to a maximum of 0.8 dB. Plus, the gain level for each of the couplings is normalized to approximately 0 dB, rather than applying a gain of 7.5 dB or more. The combination of normalization to a common gain level and the considerable reduction in gain variation provides superior performance for RF communication equipment such as receivers/demodulators used in satellite gateways and base stations, and may allow for simplified designs for RF communication equipment.

In the example illustrated in FIG. 7, the controller is configured to normalize an RF signal passing through a coupling between a first-side RF port and a second-side RF port to a target 0 dB gain level. The controller may also be configured to adjust a default target gain level by a specified offset and supply a corresponding control signal to an amplitude adjustment device to provide an RF signal passing through the coupling with a different gain level. As a first example, plot 750 illustrates a frequency response for the coupling b-F in band 721 with a −3.0 dB offset applied, in contrast to plot 741 where no offset is applied. To apply the offset, the controller may be configured to add the −3.0 dB offset to the −9.0 dB adjustment value for band 721, and as a result supply a control signal to an amplitude adjustment device for coupling b-F to select 12 dB of attenuation. As a second example, plot 752 illustrates a frequency response for the coupling b-F in band 725 with a +3.0 dB offset applied. To apply the offset, the controller may be configured to add the +3.0 dB offset to the −10.5 dB adjustment value for band 725, and as a result supply a control signal to an amplitude adjustment device for coupling b-F to select 7.5 dB of attenuation. The offset may be changed dynamically, as many amplitude adjustment device have sub-microsecond switching speeds. In some implementations, if an RF signal is attenuated when a first-side RF port is simultaneously coupled to more than one second-side RF port (for example, if the simultaneous coupling of first-side RF port b to second-side RF ports B and F causes the RF signal to second-side RF port F to be attenuated by −4 dB), the controller may be configured to apply an offset to counter such attenuation.

The controller may also be configured to obtain adjustment values for RF communication equipment attached upstream or downstream from the RF switch matrix, and determine and apply an appropriate offset to normalize and flatten the frequency response of more of the signal path. For example, many antennas, whether for reception or transmission, do not have a flat frequency response across even their intended range of frequencies. However, if such equipment is characterized and the controller provided with the characterization, the controller can adjust the amount of attenuation and/or amplification requested from an amplitude adjustment device.

Figure 9:
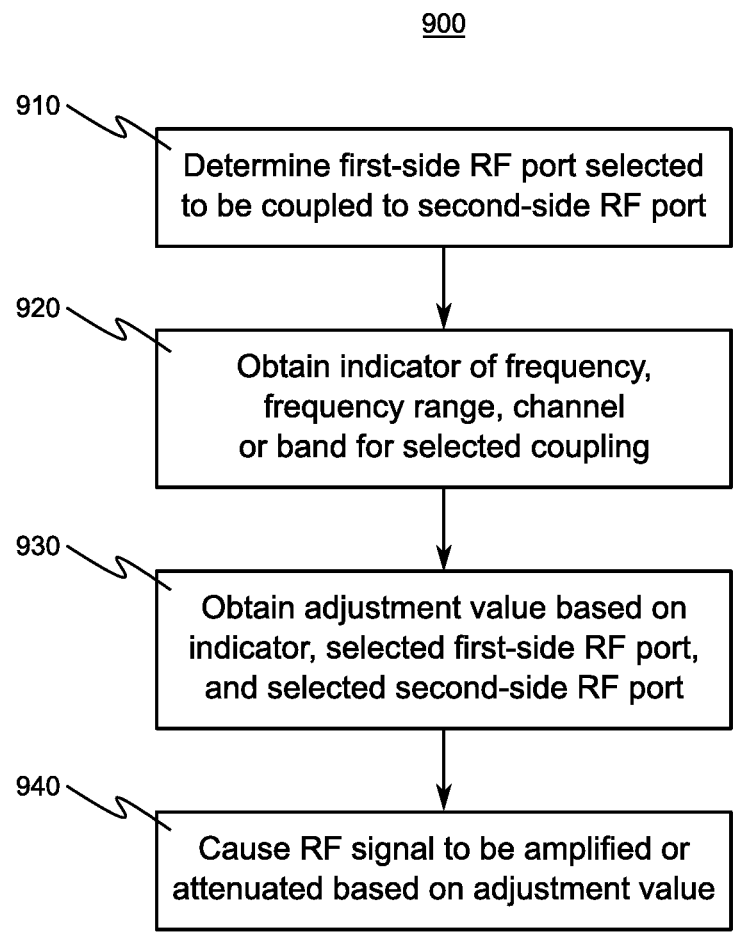
FIG. 9 illustrates an example of a method for automatically adjusting amounts of attenuation and/or amplification for couplings formed between first-side RF ports and second-side RF ports of an RF switch matrix.

FIG. 9 illustrates an example of a method 900 for automatically adjusting amounts of attenuation and/or amplification for couplings formed between first-side RF ports and second-side RF ports of an RF switch matrix. At 910, the method 900 includes determining that a first RF port has been selected to be coupled via an M by N RF switch matrix to a second RF port, wherein the M by N matrix comprises M first-side RF ports and N second-side RF ports, and the first RF port is included in the M first-side ports and the second RF port is included in the N second-side RF ports. The RF switch matrix is configured such that each of the first-side RF ports may be selectively coupled to and uncoupled from at least one of two or more of the second-side RF ports, such that RF signals are carried between coupled RF ports and are substantially not carried between uncoupled RF ports.

At 920, the method 900 includes obtaining a first indicator indicating a frequency, frequency range, channel, or band for an RF signal to be carried via the second RF port while coupled to the first RF port. In some implementations, the indication indicates a frequency, frequency range, channel, or band for a piece of RF communication equipment that is coupled to the second RF port. At 930, the method 900 includes obtaining, in response to the determination that the first RF port has been selected to be coupled to the second RF port, a first adjustment value based on the first indicator, the first RF port, and the second RF port. In some implementations, the first adjustment value may be stored in a nonvolatile memory. In some examples, a plurality of adjustment values may be obtained.

At 940, the method 900 includes causing an amplitude adjustment device configured to attenuate and/or amplify an RF signal as it passes through the first RF port or the second RF port with a selectable amount of attenuation and/or amplification to select a first amount of attenuation and/or amplification determined based on the first adjustment value. FIGS. 2-4 illustrate examples of amplitude adjustment devices configured to apply an amount of attenuation and/or amplification in response to a control signal, and FIGS. 7 and 8 illustrate examples of applying an amount of attenuation and/or amplification.

Although some of the above examples may be illustrated with respect to performing gain adjustments for a single coupling, the above techniques may be simultaneously applied for a plurality of couplings within a single RF switch matrix. For example, each of the coupled second-side RF ports A-F of receive RF switch matrix 515 in FIG. 5 may be used for different frequencies, and controller 550 may be configured to supply control signals to each coupling's corresponding amplitude adjustment device as discussed above to normalize the gain level the coupling and frequency it is being used for. The controller may be configured to obtain appropriate adjustment values and issue appropriate control signals to an amplitude adjustment device in response to a coupling being used at a new frequency, a recoupling of a first-side RF port from one second-side RF port to another, or a recoupling of a second-side RF port from one first-side RF port to another.

FIG. 10 is a block diagram that illustrates a computer system 1000 upon which aspects of this disclosure may be implemented, such as, but not limited to, controller 550 or computer components included in pieces of RF communication equipment 540 and RFTs 520, 530, 532, and 534. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT) or liquid crystal display (LCD), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Another type of user input device is a touchscreen, which generally combines display 1012 with hardware that registers touches upon display 1012.

This disclosure is related to the use of computer systems such as computer system 1000 for implementing the techniques described herein. In some examples, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 1000, various machine-readable media are involved, for example, in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A communication apparatus comprising:
    a first M by N radio frequency (RF) switch matrix comprising M first-side RF ports, N second-side RF ports, and a first plurality of amplitude adjustment devices, wherein
        M is at least 2 and N is at least 2,
        each of the first-side RF ports may be selectively coupled to and uncoupled from at least one of two or more of the second-side RF ports, such that RF signals are carried between selectively coupled RF ports,
        the first-side RF ports include a first RF port,
        the second-side RF ports include a second RF port,
        either each of the first-side RF ports includes only one of the first plurality of amplitude adjustment devices, or each of the second-side RF ports includes only one of the first plurality of amplitude adjustment devices,
        each of the first plurality of amplitude adjustment devices is configured to attenuate and/or amplify an RF signal passing through the RF port in which the amplitude adjustment device is included with a selectable amount of attenuation and/or amplification that is selected in response to a control signal supplied to the amplitude adjustment device, and
        the first plurality of amplitude adjustment devices includes a first amplitude adjustment device included in either the first RF port or the second RF port; and
    a controller configured to:
        determine the first RF port has been selected to be coupled via the first RF switch matrix to the second RF port,
        obtain a first indicator indicating a frequency, frequency range, channel, or band for an RF signal to be carried via the second RF port while coupled to the first RF port,
        obtain, in response to the determination that the first RF port has been selected to be coupled to the second RF port, a first adjustment value based on the first indicator, the first RF port, and the second RF port, and
        supply a first control signal to the first amplitude adjustment device to cause the first amplitude adjustment device to select a first amount of attenuation and/or amplification, wherein the first control signal is generated based on the first adjustment value.

2. The communication apparatus of claim 1, wherein:
    each of the first plurality of amplitude adjustment devices is included in one of the second-side RF ports; and
    each of the second-side RF ports includes only one of the first plurality of amplitude adjustment devices.

3. The communication apparatus of claim 2, wherein the second RF port is configured to receive an RF signal from the first port while the second RF port is selectively coupled to the first RF port.

4. The communication apparatus of claim 1, wherein
    each of the first plurality of amplitude adjustment devices is included in one of the first-side RF ports; and
    each of the first-side RF ports includes only one of the first plurality of amplitude adjustment devices.

5. The communication apparatus of claim 1, further comprising a nonvolatile memory, wherein the controller is further configured to obtain the first adjustment value from the nonvolatile memory.

6. The communication apparatus of claim 5, wherein the controller is further configured to:
    obtain a second adjustment value, different from the first adjustment value, from the nonvolatile memory based on the first indicator, the first RF port, and the second RF port; and
    generate the first control signal based on the first adjustment value and the second adjustment value.

7. The communication apparatus of claim 1, wherein:
    the first-side RF ports include a third RF port different from the first RF port;
    the second-side RF ports include a fourth RF port different from the second RF port;
    the first plurality of amplitude adjustment devices includes a second amplitude adjustment device included in either the third RF port or the fourth RF port; and
    the controller is further configured to:
        determine the third RF port has been selected to be coupled via the first RF switch matrix to the fourth RF port,
        obtain a second indicator indicating a frequency, frequency range, channel, or band for an RF signal to be carried via the fourth RF port while coupled to the third RF port,
        obtain, in response to the determination that the third RF port has been selected to be coupled to the fourth RF port, a second adjustment value based on the second indicator, the third RF port, and the fourth RF port, and
        supply a second control signal to the second amplitude adjustment device to cause the second amplitude adjustment device to select a second amount of attenuation and/or amplification, wherein the second control signal is generated based on the second adjustment value.

8. The communication apparatus of claim 1, wherein:
    the first-side RF ports include a third RF port different from the first RF port;
    the first amplitude adjustment device is included in the second RF port; and
    the controller is further configured to:
        determine, after supplying the first control signal, the third RF port has been selected to be coupled via the first RF switch matrix to the second RF port,
        obtain, after supplying the first control signal, a second indicator different from the first indicator, the second indicator indicating a frequency, frequency range, channel, or band for an RF signal to be carried via the second RF port while coupled to the third RF port,
obtain, in response to the determination the third RF port has been selected to be coupled to the second RF port, a second adjustment value based on the second indicator, the third RF port, and the second RF port, and
supply a second control signal to the first amplitude adjustment device to cause the first amplitude adjustment device to select a second amount of attenuation and/or amplification, wherein the second control signal is generated based on the second adjustment value.

9. The communication apparatus of claim 1, further comprising:
a second X by Y RF switch matrix comprising X third-side RF ports, Y fourth-side RF ports, and a second plurality of amplitude adjustment devices, wherein
X is at least 2 and Y is at least 2,
each of the third-side RF ports may be selectively coupled to and uncoupled from at least one of two or more of the fourth-side RF ports, such that RF signals are carried between selectively coupled RF ports,
the third-side RF ports include a third RF port,
the fourth-side RF ports include a fourth RF port,
none of the second plurality of amplitude adjustment devices are included in the first plurality of amplitude adjustment devices,
either each of the third-side RF ports includes only one of the second plurality of amplitude adjustment devices, or each of the fourth-side RF ports includes only one of the second plurality of amplitude adjustment devices,
each of the second plurality of amplitude adjustment devices is configured to attenuate and/or amplify an RF signal passing through the RF port in which the amplitude adjustment device is included with a selectable amount of attenuation and/or amplification that is selected in response to a control signal supplied to the amplitude adjustment device, and
the second plurality of amplitude adjustment devices includes a second amplitude adjustment device included in either the third RF port or the fourth RF port; and
wherein the controller is further configured to:
determine, in association with the determination that the first RF port has been selected to be coupled to the second RF port, the third RF port has been selected to be coupled via the second RF switch matrix to the fourth RF port,
obtain a second indicator indicating a frequency, frequency range, channel, or band for an RF signal to be carried via the fourth RF port while coupled to the third RF port,
obtain, in response to the determination that the third RF port has been selected to be coupled to the fourth RF port, a second adjustment value based on the second indicator, the third RF port, and the fourth RF port, and
supply a second control signal to the second amplitude adjustment device to cause the second amplitude adjustment device to select a second amount of attenuation and/or amplification, wherein the second control signal is generated based on the second adjustment value.

10. The communication apparatus of claim 1, wherein the controller is further configured to:
receive a gain offset value to be applied to the RF signal to be carried via the second RF port; and
either
obtain the first adjustment value based on the first indicator, the first RF port, the second RF port, and the gain offset value, or
generate the first control signal based on the first adjustment value and the gain offset value.

11. The communication apparatus of claim 1, further comprising a temperature sensor, wherein the controller is further configured to:
obtain a temperature of the communication apparatus via the temperature sensor; and either
obtain the first adjustment value based on the first indicator, the first RF port, the second RF port, and the obtained temperature, or
generate the first control signal is generated based on the first adjustment value and the obtained temperature.

12. A method of operating a communication apparatus, the method comprising:
determining that a first radio frequency (RF) port has been selected to be coupled via an M by N RF switch matrix to a second RF port, wherein
the M by N radio frequency (RF) switch matrix comprises M first-side RF ports and N second-side RF ports,
the first RF port is included in the M first-side RF ports,
the second RF port is included in the N second-side RF ports,
M is at least 2 and N is at least 2, and
each of the first-side RF ports may be selectively coupled to and uncoupled from at least one of two or more of the second-side RF ports, such that RF signals are carried between selectively coupled RF ports;
obtaining a first indicator indicating a frequency, frequency range, channel, or band for an RF signal to be carried via the second RF port while coupled to the first RF port;
obtaining, in response to the determination that the first RF port has been selected to be coupled to the second RF port, a first adjustment value based on the first indicator, the first RF port, and the second RF port; and
causing a first amplitude adjustment device configured to attenuate and/or amplify an RF signal as it passes through the first RF port or the second RF port with a selectable amount of attenuation and/or amplification to select a first amount of attenuation and/or amplification determined based on the first adjustment value.

13. The method of claim 12, wherein the first amplitude adjustment device is configured to attenuate and/or amplify an RF signal as it passes through the second RF port.

14. The method of claim 12, wherein the first amplitude adjustment device is configured to attenuate and/or amplify an RF signal as it passes through the first RF port.

15. The method of claim 12, wherein the obtaining the first adjustment value includes obtaining the first adjustment value from a nonvolatile memory included in the communication apparatus.

16. The method of claim 15, further comprising:
obtaining, in response to the determination that the first RF port has been selected to be coupled to the second RF port, a second adjustment value based on the first indicator, the first RF port, and the second RF port; and determining the first amount of attenuation and/or amplification based on the first adjustment value and the second adjustment value.

17. The method of claim 12, further comprising:
determining that a third RF port has been selected to be coupled via the RF switch matrix to a fourth RF port, wherein
  the third RF port is included in the M first-side RF ports and is different from the first RF port, and
  the fourth RF port is included in the N second-side RF ports and is different from the second RF port;
obtaining a second indicator indicating a frequency, frequency range, channel, or band for an RF signal to be carried via the fourth RF port while coupled to the third RF port;
obtaining, in response to the determination that the third RF port has been selected to be coupled to the fourth RF port, a second adjustment value based on the second indicator, the third RF port, and the fourth RF port; and
causing a second amplitude adjustment device configured to attenuate and/or amplify an RF signal as it passes through the third RF port or the fourth RF port with a selectable amount of attenuation and/or amplification to select a second amount of attenuation and/or amplification determined based on the second adjustment value.

18. The method of claim 12, further comprising:
determining, after causing the first amplitude adjustment device to select the first amount of attenuation and/or amplification, a third RF port has been selected to be coupled via the RF switch matrix to the second RF port, wherein the third RF port is included in the first-side RF ports and is different from the first RF port;
obtaining, after causing the first amplitude adjustment device to select the first amount of attenuation and/or amplification, a second indicator different from the first indicator, the second indicator indicating a frequency, frequency range, channel, or band for an RF signal to be carried via the second RF port while coupled to the third RF port;
obtaining, in response to the determination the third RF port has been selected to be coupled to the second RF port, a second adjustment value based on the second indicator, the third RF port, and the second RF port; and
causing the first amplitude adjustment device to select a second amount of attenuation and/or amplification determined based on the second adjustment value, wherein the first amplitude adjustment device is configured to attenuate and/or amplify an RF signal as it passes through the second RF port.

19. The method of claim 12, further comprising:
obtaining a temperature of the communication apparatus; and
obtaining the first adjustment value based on the first indicator, the first RF port, the second RF port, and the obtained temperature.

20. A nontransitory computer readable medium including instructions which, when executed by one or more processors, cause the one or more processors to perform the method of claim 12.

* * * * *